United States Patent
Zhang

(10) Patent No.: US 7,640,670 B2
(45) Date of Patent: Jan. 5, 2010

(54) INSPECTING TOOL

(75) Inventor: Bing-Jun Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 117 days.

(21) Appl. No.: 12/051,851

(22) Filed: Mar. 20, 2008

(65) Prior Publication Data

US 2009/0151183 A1  Jun. 18, 2009

(30) Foreign Application Priority Data

Dec. 13, 2007  (CN) .................. 2007 1 0203027

(51) Int. Cl.
*G01B 3/50* (2006.01)
(52) U.S. Cl. .................. 33/1 BB; 33/501.45; 33/542
(58) Field of Classification Search ............... 33/1 BB, 33/501, 501.05, 501.08, 501.45, 542, 545, 33/546, 547, 562, 567, 613, 655; D10/64
See application file for complete search history.

(56) References Cited

U.S. PATENT DOCUMENTS

| | | | | |
|---|---|---|---|---|
| 4,216,586 | A | * | 8/1980 | Long .................. 33/544.4 |
| 4,437,242 | A | * | 3/1984 | Battle ................. 33/501.45 |
| 5,042,161 | A | * | 8/1991 | Hodge ................ 33/501.45 |
| 5,471,757 | A | * | 12/1995 | McDonald ........... 33/501.45 |
| D425,702 | S | * | 5/2000 | Baich .................. D3/282 |
| 6,571,484 | B2 | * | 6/2003 | Hastilow .............. 33/546 |
| 7,024,787 | B2 | * | 4/2006 | Varsell et al. ........ 33/562 |
| 7,143,522 | B2 | * | 12/2006 | Brueckert et al. ..... 33/542 |
| 2007/0209748 | A1 | * | 9/2007 | Lane .................. 156/71 |

* cited by examiner

*Primary Examiner*—R. A. Smith
(74) *Attorney, Agent, or Firm*—Frank R. Niranjan

(57) ABSTRACT

An inspecting tool for inspecting whether inside dimensions of a server chassis is qualified or not is presented. The inspecting tool includes a rectangular frame and a handle attached to the fame. A width of the frame is equal to a minimum desirable value of an inside width of the server chassis, and a height of the frame is equal to a minimum desirable value of an inside height of the server chassis.

6 Claims, 2 Drawing Sheets

INSPECTING TOOL

BACKGROUND

1. Field of the Invention

The present invention relates to inspecting tools, and more particularly to a tool for checking whether inside dimensions of a server chassis are qualified or not.

2. Description of Related Art

A typical blade server includes a server chassis with a plurality of receiving spaces defined therein and a plurality of blades correspondingly received in the receiving rooms. Inside sizes of the receiving rooms of the server chassis may not be consistent from one chassis to another because of imprecise manufacturing, which can lead to a poor fit of the blades in the receiving rooms.

Typically, when checking whether the inside dimensions of the server chassis are qualified or not, a blade is inserted into each of the receiving rooms. However, the blade is too heavy to be manipulated conveniently. Furthermore, the blade tends to be worn out so that the accuracy of the check cannot be assured.

What is desired, therefore, is an inspecting tool that can be conveniently manipulated to check inside dimensions of a sever chassis.

SUMMARY

An exemplary inspecting tool for checking whether inside dimensions of a server chassis are qualified or not is presented. The inspecting tool includes a rectangular frame and a handle attached to the fame. A width of the frame is equal to a minimum desirable value of an inside width of the server chassis, and a height of the frame is equal to a minimum desirable value of an inside height of the server chassis.

Other advantages and novel features of the present invention will become more apparent from the following detailed description of embodiment when taken in conjunction with the accompanying drawings, in which:

DETAILED DESCRIPTION

Figure 1:
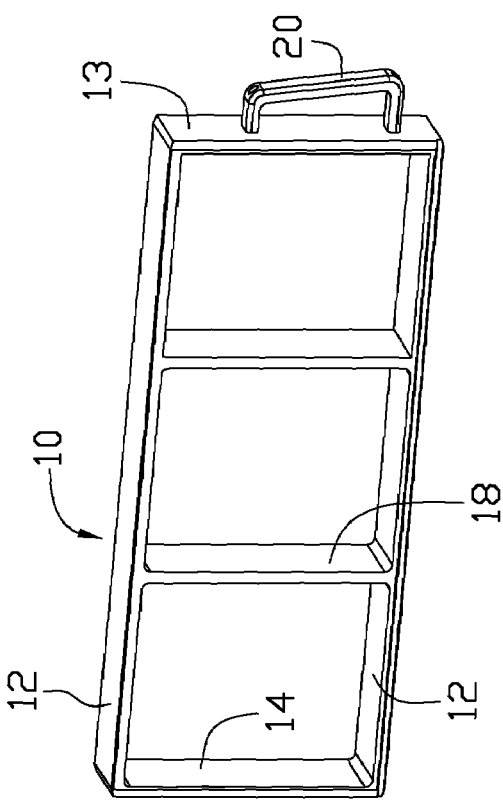
FIG. 1 is an isometric view of an inspecting tool in accordance with an embodiment of the present invention, together with a server chassis.
Figure 1:
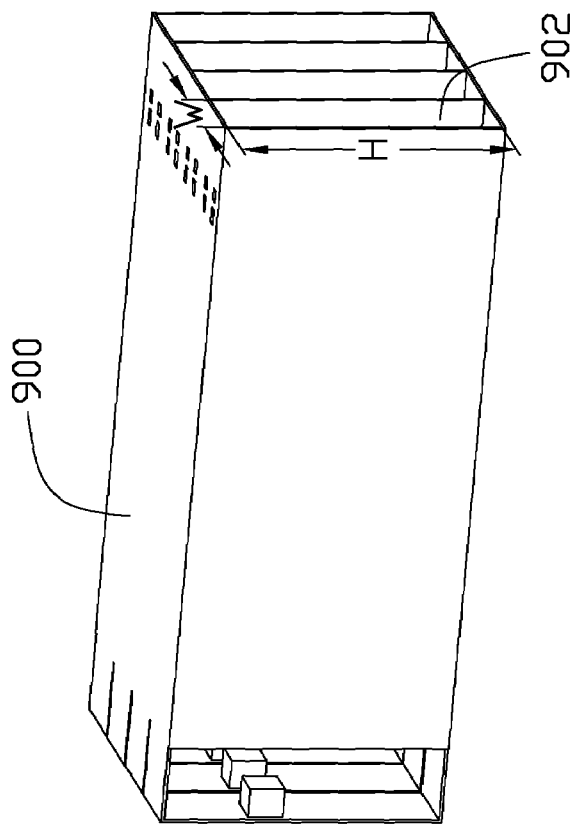

Referring to FIG. 1, an inspecting tool in accordance with an exemplary embodiment of the present invention is provided for checking whether inside dimensions of a server chassis 900 are up to spec, the inspecting tool includes a frame 10 and a handle 20 attached to the frame 10. An inside of the sever chassis 900 is partitioned into a plurality of receiving rooms 902 to be inspected.

Figure 2:
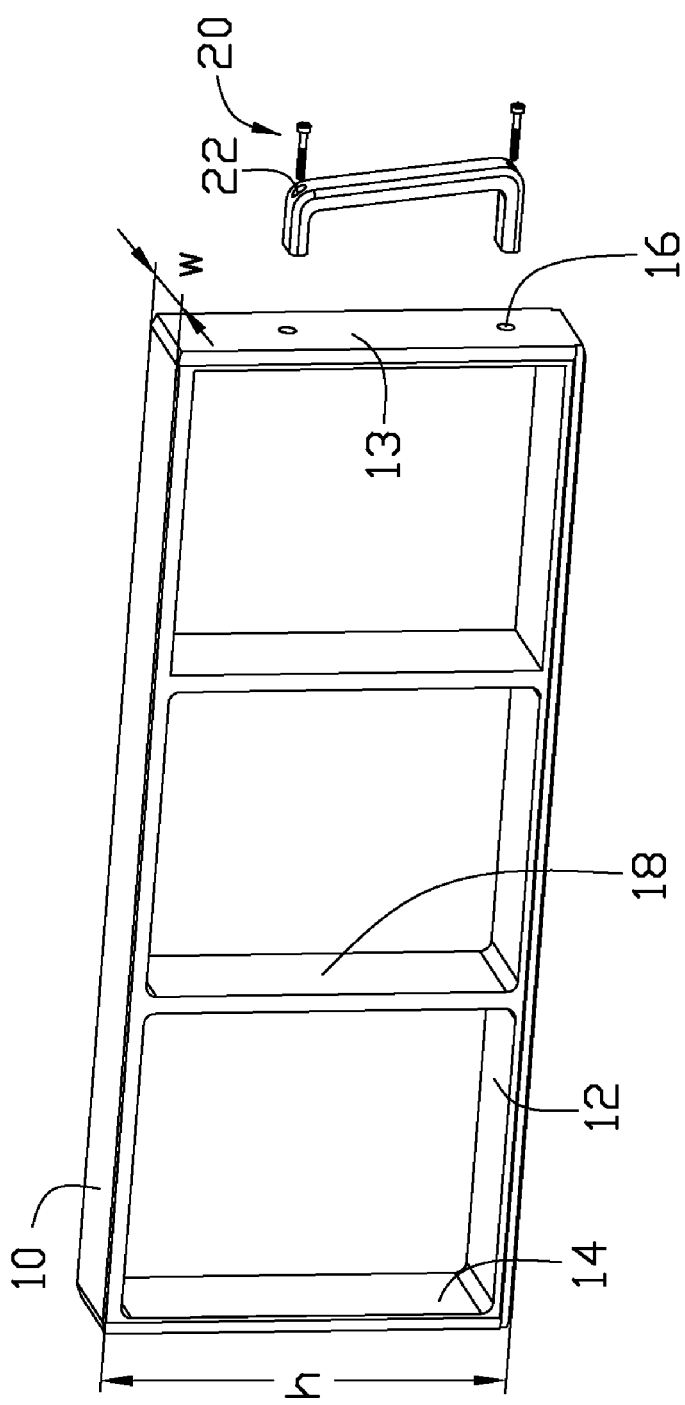
FIG. 2 is an exploded view of the inspecting tool of FIG. 1.

Referring also to FIG. 2, the frame 10 is made from an anti-abrasive material. The frame 10 is rectangular and includes a pair of parallel sidewalls 12, a front end-wall 13 and a rear end-wall 14. The frame 10 is hollow for minimizing the weight thereof. A plurality of ribs 18 is formed within the frame 10 and perpendicularly connected to the sidewalls 12 so as to prevent distortion of the frame 10. A pair of screw holes 16 is defined in the front end-wall 13 of the frame 10. A width w of the frame 10 is equal to a minimum desirable value of a width W (shown in FIG. 1) of each of the receiving rooms 902. A height h of the frame 10 is equal to a minimum desirable value of a height H (shown in FIG. 1) of each of the receiving rooms 902.

The handle 20 is C-shaped with a pair of through holes 22 respectively defined in opposite ends thereof.

In assembly, the through holes 22 of the handle 10 are respectively aligned with the screw holes 16 of the frame 10. A pair of screws respectively passes through the through holes 22 of the handle 20 and screws into the corresponding screw holes 16 of the frame 10. Thus, the handle 20 is attached to the front wall 13 of the frame 10.

In use, the handle 20 is manipulated to insert the frame 10 into one of the receiving rooms 902 of the server chassis 900. If the frame 10 can be inserted smoothly, the inside size of the receiving room 902 is qualified, then the next receiving room 902 is check and so on. If all the receiving rooms 902 pass their check, the server chassis 900 is qualified. Otherwise, the server chassis 900 is unqualified.

The foregoing description of the exemplary embodiment of the invention has been presented only for the purposes of illustration and description and is not intended to be exhaustive or to limit the invention to the precise forms disclosed. Many modifications and variations are possible in light of the above teaching. The embodiments was chosen and described in order to explain the principles of the invention and their practical application so as to enable others skilled in the art to utilize the invention and various embodiments and with various modifications as are suited to the particular use contemplated. Alternative embodiment will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. An inspecting tool for checking whether inside dimensions of a server chassis are qualified or not, the inspecting tool comprising:
   a rectangular frame configured for being inserted into the server chassis, and having a width equal to a minimum desirable value of an inside width of the server chassis and a height equal to a minimum desirable value of an inside height of the server chassis; and
   a handle attached to the fame.

2. The inspecting tool as described in claim 1, wherein the frame is hollow for minimizing the weight thereof.

3. The inspecting tool as described in claim 2, wherein the frame includes a pair of sidewalls and a pair of end-walls connecting to ends of the sidewalls respectively.

4. The inspecting tool as described in claim 3, wherein a plurality of ribs is formed within the frame perpendicularly connecting to the sidewalls between the end-walls.

5. The inspecting tool as described in claim 4, wherein the handle is C-shaped with a pair of screw holes defined in opposite ends thereof respectively, a pair of through holes is defined in one of the walls of the fame configured for being aligned with the screw holes of the handle, a pair of screws respectively passes through the through holes of the frame and screws into the screw holes of the handle.

6. The inspecting tool as described in claim 1, wherein the frame is made from an anti-abrasive material.

* * * * *